United States Patent
Sommers et al.

[11] Patent Number: 5,211,921
[45] Date of Patent: * May 18, 1993

[54] PROCESS OF MAKING NIOBIUM OXIDE

[75] Inventors: James A. Sommers; Verlin Q. Perkins, both of Albany, Oreg.

[73] Assignee: Teledyne Industries, Inc., Albany, Oreg.

[*] Notice: The portion of the term of this patent subsequent to Feb. 23, 2010 has been disclaimed.

[21] Appl. No.: 908,804

[22] Filed: Jul. 7, 1992

Related U.S. Application Data

[63] Continuation of Ser. No. 721,886, Jun. 27, 1991, abandoned.

[51] Int. Cl.$^5$ .................... C01G 33/00; C01G 31/00; C01G 35/00; C01B 33/113
[52] U.S. Cl. .................... 423/62; 423/138; 423/325; 423/344; 423/406; 423/409; 423/592; 423/644
[58] Field of Search ................. 423/62, 406, 409, 411, 423/644, 592, 325, 138; 501/96, 87, 88

[56] References Cited

U.S. PATENT DOCUMENTS

| | | | |
|---|---|---|---|
| 2,164,198 | 6/1939 | Clements et al. | 148/4 |
| 2,474,021 | 6/1949 | Vining | 23/184 |
| 2,553,444 | 5/1951 | Dunn et al | 241/20 |
| 2,682,445 | 6/1954 | Basel | 23/87 |
| 2,849,275 | 8/1958 | Bleecker | 23/14 |
| 2,886,616 | 5/1959 | Mertz et al. | 260/683.15 |
| 3,053,620 | 9/1962 | Greenberg et al. | 23/87 |
| 3,230,077 | 1/1966 | Hiller | 75/84.5 |
| 3,300,297 | 1/1967 | Fields | 75/24 |
| 3,322,510 | 5/1967 | Anselin et al. | 23/347 |
| 3,356,513 | 12/1967 | Washburn | 106/55 |
| 3,425,826 | 2/1969 | Schmidt et al. | 75/84 |
| 3,461,190 | 8/1969 | Kemeny | 263/52 |
| 3,539,165 | 11/1970 | Ingels | 263/40 |
| 3,573,000 | 3/1971 | Toomey et al. | 23/277 |
| 3,639,101 | 2/1972 | Washburn | 23/203 |
| 3,854,882 | 12/1974 | Washburn | 23/253 A |
| 3,999,981 | 12/1976 | Brandstatter | 75/84 |
| 4,029,740 | 6/1977 | Ervin, Jr. | 423/251 |
| 4,211,754 | 7/1980 | Van Hecke et al. | 423/62 |
| 4,318,897 | 3/1982 | Gonczy | 423/644 |
| 4,425,318 | 1/1984 | Maeland et al. | 423/644 |
| 4,440,737 | 4/1984 | Libowitz et al. | 423/644 |
| 4,607,826 | 8/1986 | Ron | 266/251 |
| 4,720,300 | 1/1988 | Nishizawa et al. | 75/85.4 |
| 4,727,928 | 3/1988 | De Vynck et al. | 164/469 |
| 4,728,507 | 3/1988 | Worcester | 423/645 |
| 4,741,894 | 3/1988 | Melas | 423/592 |
| 4,812,301 | 3/1989 | Davidson et al. | 423/440 |
| 4,913,778 | 4/1990 | Lee et al. | 203/29 |

FOREIGN PATENT DOCUMENTS

| | | |
|---|---|---|
| 470022 | 12/1950 | Canada . |
| 541517 | 5/1953 | Canada ................. 75/622 |
| 541516 | 5/1957 | Canada ................. 75/622 |
| 554840 | 3/1958 | Canada . |

(List continued on next page.)

OTHER PUBLICATIONS

Mellor, *A Comprehensive Treatise on Inorganic Chemistry*, vol. VIII, Longmans, Green, & Co., 1947, pp. 124–126.

(List continued on next page.)

Primary Examiner—Michael Lewis
Assistant Examiner—Stephen G. Kalinchak
Attorney, Agent, or Firm—Shoemaker and Mattare, Ltd.

[57] ABSTRACT

A process for making metal oxides including niobium or tantalum oxides from ferro and nickel alloys containing these metals involving the multiple steps of hydriding the ferro or nickel alloy selected, under conditions of suitable temperature and pressure to render the alloys friable, subdividing the hydrided product into selected particle sizes, then nitriding with a nitrogen-containing gas at elevated temperatures above 500° C. to form the alloy constituent nitrides, thereafter leaching the nitrides formed with aqueous acid to separate the formed ferro or nickel nitride from the acid soluble nitrides from the acid insoluble nitrides, calcining the acid insoluble nitrides with oxygen-containing gas under conditions suitable for the formation of the metal oxide of the acid soluble nitride.

13 Claims, 1 Drawing Sheet

FOREIGN PATENT DOCUMENTS

| | | |
|---|---|---|
| 903034 | 2/1954 | Fed. Rep. of Germany . |
| 1068683 | 11/1959 | Fed. Rep. of Germany . |
| 1082240 | 5/1960 | Fed. Rep. of Germany . |
| 339426 | 2/1991 | Japan . |
| 485021 | 6/1938 | United Kingdom . |
| 660397 | 11/1951 | United Kingdom . |
| 771144 | 3/1957 | United Kingdom . |
| 866771 | 5/1961 | United Kingdom . |
| 910289 | 11/1962 | United Kingdom . |
| 1211757 | 3/1973 | United Kingdom . |

OTHER PUBLICATIONS

Hattancadi, "How to Set a Periodic Table", *Industrial Chemist*, vol 9, No. 5 1988, pp. 20–23.

Hart, The Reduction of Columbic Acid and the Measurement of the Oxidation Potential of the Pentavalent-Trivalent Columbium System, 226–7, 1926.

Sherwood, Columbium, Rare Metals Handbook, pp. 149–177.

McClain et al., Zirconium-Hafnium Separation, Chapter 4, pp. 64–73, 1960.

Kroll et al., Pilot Plants, Production of Malleable Zirconium, vol. 42, No. 2, pp. 395–396, 1950.

Fairgrieve et al., Hafnium, Molybdenum Techniques Revealed, Journal of Metals, pp. 25–26, 1960.

Spink, Fused-Salt Scrubbing of Zirconium Tetrachloride, Transactions Aime, vol. 224, pp. 965–970, 1962.

Fairbrother, The Chemistry of Niobium and Tantalum, pp. 4, 5, 8–19, 1967.

de Hoboken, Production of Tantalum and/or Columbium, pp. 1–6.

Pennington, Derivatives of Columbium and Tantalum, 1985.

Duke, Resources and Planning Advisory Council, vol. VIII, pp. 1–51, 1969.

Stuart, Niobium, Proceedings of the International Symposium, pp. 3–16; 1237–1249, 1981.

Gibalo, Analytical Chemistry of Niobium and Tantalum, pp. 118–140, 1970.

Merrill, The Separation of Columbium and Tantalum by Means of Selenium Oxychloride, pp. 2378–2383, 1921.

PROCESS OF MAKING NIOBIUM OXIDE

This is a continuation of application Ser. No. 07/721,886, filed Jun. 27, 1991, now abandoned.

FIELD OF THE INVENTION

This invention relates to the preparation of metal oxides of metals from Groups IV, V and VI, specifically including oxides of niobium and tantalum, and more particularly to a novel process for the direct production of substantially pure metal oxides from ferrometal alloys and nickel metal alloys.

BACKGROUND OF THE INVENTION

The preparation of relatively pure Group IV, V and VI metal oxides is important commercially. Niobium oxide is exemplary of this need as it is an important intermediate for the production of pure niobium metal and high purity, i.e., vacuum grade, ferroniobium. It is, therefore, desirable to obtain substantially pure niobium oxide for the subsequent reduction reaction to niobium metal or by metallothermic reaction with iron to form vacuum grade ferroniobium.

A ready source of niobium or tantalum is available in the form of metallurgical grade ferrometal alloys of these metals. For example, ferroniobium typically containing predominately iron and niobium and preferably more than 50% by weight niobium and most preferably between about 63% to 67% by weight niobium with the balance including iron and minor amounts of silicon and smaller amounts of tantalum, phosphorous and titanium is an attractive source of niobium which currently has not been commercially exploited. The presently available processes for the recovery of niobium oxide ($Nb_2O_5$) from this source includes the chlorination of FeNb to produce ferric chloride ($FeCl_3$) and niobium pentachloride ($NbCl_5$) followed by a high temperature separation of the vapor phases of $FeCl_3$ from the ($NbCl_5$) by passing the vapor phases of these mixed chlorides through a bed of sodium chloride (NaCl) where the $FeCl_3$ forms a solid eutectic composition with the NaCl, thereby effectively removing it from the vapor stream. Niobium chloride is then recovered by subsequently cooling the salt vapor to condense the ($NbCl_5$). Conventionally, $NbCl_5$ is then hydrolyzed by its addition to water which can then be neutralized, and the hydrolysis product dried, before calcining in a heated kiln in an oxygen containing atmosphere to produce relatively pure $Nb_2O_5$. The drying and calcining is both energy intensive and expensive.

The preparation of $Nb_2O_5$ by the previously described chlorination route utilizes toxic chlorine gas reacted exothermically at elevated temperatures and pressures. These conditions can produce severe corrosion problems. Special equipment is necessary for handling the highly pressurized, corrosive liquid chlorine and it must be safely vaporized, metered and fed into the reactor. Likewise, the most suitable material for large scale reactor construction is graphite. This is a brittle material which can fracture and fail abruptly after a short time in use in this environment. Further, the chlorine is normally used in excess to ensure complete reaction with the FeNb and the excess must be neutralized creating an expensive, undesirable by-product.

In addition to the foregoing, the hydrolysis step involves contacting the condensed chloride product with a neutralizing agent such as ammonia, and then filtering the resulting hydrous oxide slurry or cake, optionally drying and then air firing it to the oxide in a kiln. Such slurries and cakes are gelatinous and therefore hard to handle. There is need for a process which eliminates the problems associated with the reactants, reaction conditions, intermediate products and by products.

OBJECTS OF THE INVENTION

It is, therefore, an objective of the present invention to provide a process for the preparation of substantially pure niobium oxide ($Nb_2O_5$) from commercially available ferroniobium alloy.

It is a further objective of the present invention to provide a process for the preparation of substantially pure $Nb_2O_5$ from ferroniobium alloy without employing the process step of chlorination.

It is a still further object of the present invention to provide a process for the preparation of substantially pure $Nb_2O_5$ from ferroniobium alloy without the process steps including chloride hydrolysis and neutralization.

A process for the preparation of substantially pure metal oxide derived from ferrometal alloys and nickel metal alloys where the Group IV, V and VI metal selected is provided by first reacting the metal alloy with hydrogen under conditions selected to produce a friable ferrometal alloy or nickel metal alloy hydride product containing at least some hydrogen. The friable material is then crushed and sized to preselected sizes and reacted with a nitrogen-containing gas to produce nitrides, for example, nitrides of iron and niobium. Where ferroniobium alloy is hydrided and then reacted with nitrogen, the nitride-containing product produced by the foregoing reactions are then leached with dilute acid leach solution to substantially remove the acid soluble iron or nickel content of the nitride-containing product. The acid insoluble metal nitride recovered can then be dried and contacted with a suitable oxidizing agent under conditions selected to convert substantially all of the insoluble recovered metal nitride product into its respective metal oxide. Optionally, in the case of metals such as niobium and tantalum, leaching with an aqueous acid leach containing fluoride ions may be employed to remove unwanted impurities such as phosphorous and silicon.

DETAILED DESCRIPTION OF THE PREFERRED EMBODIMENTS

Figure 1:
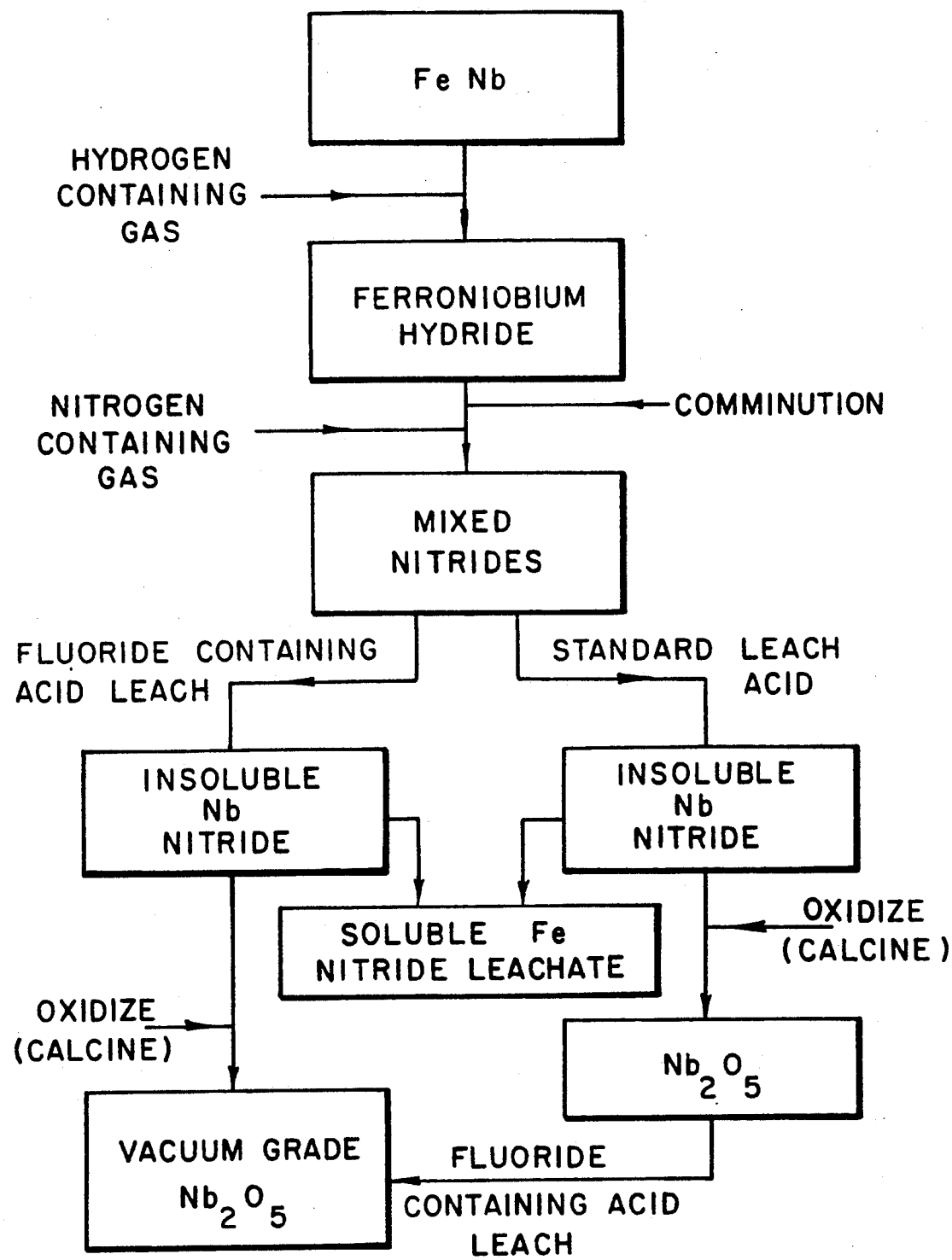
FIG. 1 is a schematic block diagram of the process of the present invention.

The present process is embodied in the following steps when applied to the preparation of niobium oxide from ferroniobium alloy.

Contacting ferroniobium with hydrogen-containing gas substantially free of oxygen;

2) Grinding the product of step 1) to preselected particle sizes;

3) Reacting the product of step 2) with nitrogen-containing gas substantially free of oxygen at elevated temperatures;

4) Leaching of the product of step 3) with an aqueous acid leach solution; and

5) Oxidation of the leached product at elevated temperatures in the presence of an oxygen-containing gas to produce niobium oxide.

Hydriding of Ferroniobium

Metallurgical grade ferroniobium is used as the starting material. Typically, the ferroniobium will contain from between about 60 to about 80% by weight niobium, about 20 and 40 weight percent iron and minor amounts, i.e., less than about 10% total weight percent of silicon, aluminum, tantalum, phosphorus and titanium.

The ferroniobium is contacted in a suitable reaction vessel with an exclusive atmosphere of hydrogen gas (i.e., in the absence of oxygen or other reactive gases) preferably maintained at a positive pressure of up to about 15 psig.

Preferably, the ferroniobium in less than about one inch chunks is charged into a vacuum-tight, sealable reactor. The reactor is then evacuated and backfilled with hydrogen to a positive pressure up to from about 3 psig to about 15 psig. The reaction begins immediately at room temperature and is exothermic. Higher temperatures may be employed as well as higher pressures up to 10 to 15 psig, however, that is not necessary for a successful reaction and acceptable reaction rate for the uptake of the hydrogen by the ferroniobium. When the hydrogen level of the product is raised to above about 200 ppm this level of hydrogen in the ferroniobium provides a product which is friable and easily comminuted into preselected particle sizes suitable for the subsequent reactions. The product can contain much higher levels of hydrogen, i.e., substantially above 2000 ppm, however, 1200 ppm is normally observed in the reaction product.

Grinding the Product

The product of the hydrogen-contacting or hydriding step containing between about 200 to 3000 ppm hydrogen and typically about 1200 ppm hydrogen is removed from the reaction vessel and comminuted by grinding or rod milling or other equivalent operation to prepare a ferroniobium hydride product preferably having a particle size of less than 20 mesh and most preferably less than 140 mesh.

Reaction with Nitrogen

In a suitable reactor, the comminuted product of ferroniobium described hereinbefore, at preselected particle sizes, is charged into a suitable reactor where it is contacted with a nitrogen-containing gas containing substantially no oxygen at elevated temperatures. Preferably, the reactor is made of a non-reactive and non-contaminating material such as a nickel-containing metal alloy. Typically, the reactor is evacuated and then backfilled with nitrogen, in the absence of oxygen, and nitrogen continuously supplied at a positive pressure. Subatmospheric pressure can, however, be employed with a suitable reactor. To initiate the reaction, the temperature of the reactor is raised to a temperature of from about 500° C. to about 800° C. After the reaction is initiated, the feed rate is controlled to maintain the exothermic reaction at an elevated temperature of from about 1100° C. to about 1400° C. for a sufficient period of time for the reaction to continue to run to completion. When the feed is terminated, the vessel is maintained with a positive pressure of nitrogen until the reaction has run to completion and the vessel has cooled. Typically, 6 to 48 hours may be required. The weight gain of the charge from the reaction with nitrogen will typically be on the order to 8 to 12 percent by weight of the charge.

The following examples further characterize the process variables.

EXAMPLE 1

A charge of 8.4 lb of ferroniobium hydride product prepared as described herein by contacting ferroniobium with hydrogen gas was placed in a lidded, cylindrical stainless steel vessel. The vessel was evacuated, purged with argon and then fed with nitrogen gas while the temperature of the vessel was raised by heating. The temperature was monitored. At a vessel temperature of about 538° C., the uptake of nitrogen was significant. Nitrogen was continuously fed into the vessel. The flow was increased when necessary to maintain a positive pressure during the course of the reaction. As the uptake of nitrogen proceeded, the temperature of the reaction vessel rose over about one hour to about 1250° C. due to the exothermic nature of the reaction. The temperature stayed over 1200° C. for one hour and then cooled slowly over about 2 hours to about 1150° C. It remained at 1150° C. for 19 hours under constant nitrogen flow and then allowed to cool to ambient temperature. The weight gain was 9.1% by weight of the original charge.

Leaching of the Nitride

The nitride product recovered from the nitride reaction was then contacted with an aqueous acid preferably dilute hydrochloric acid at moderate temperatures (i.e., 40° C. to 60° C.) to dissolve and leach away any iron nitrides formed. The soluble iron nitride is substantially leached away from the niobium nitrides formed. Normally, ferroniobium alloys are completely unaffected even by prolonged contact with strong hydrochloric acid. In the process of the present invention, there are no requirements for excessively strong acid, excessively elevated temperatures or prolonged leaching times when separating the iron nitrides from the niobium nitrides formed as described herein.

EXAMPLE 2

A total of 2270 grams of the nitrided ferroniobium product, produced as described hereinbefore in Example 1, was contacted with 22.7 liters of 2 and held at 46° C. The temperature varied from between about 46° C. to 55° C. over 4 hours of contact time with agitation. The product was then filtered away from the leach solution and further washed with 2N HCl and then 30 liters of distilled water. The product was dried at 130° C. for 12 hours and 1788 g of dried product recovered.

Oxidation of Niobium Nitride

The described leached and dried product is contacted with an oxidizing agent to produce niobium oxide.

EXAMPLE 3

Two runs of 300 lb scale, designated PP1 and PP2 were conducted.

Preparation of the Ferroniobium Feed

In a hydride run designated HLF1, 548 lb of ferroniobium feed was placed inside a vessel, which was evacuated overnight to 190 microns pressure. The vessel was then pressurized with hydrogen gas to 6 psig. The charge absorbed hydrogen rapidly, pulling a partial vacuum in the system. It was stored under static pressure overnight, and by morning registered a vacuum of 12 inches of mercury. The charge continued to consume hydrogen until afternoon, at which time the uptake began to slow markedly. The vessel was hydriding, approximately 215 cubic feet of hydrogen gas was fed to the system, as measured by the rough gauge readings. This corresponded to a hydrogen content of about 2000 ppm. The charge was placed upon a sieve screen where, without deliberate comminution, 215 pounds passed directly through the −20 mesh screen. The entire charge was milled to −140 mesh. A sample of the final product gave a hydrogen level of 1200 ppm. A further batch was similarly processed and the two batches were blended to serve as feed to runs PP1 and PP2.

Run PP1

An inconel reaction vessel, 24" diameter, 72" tall, mounted inside an electric furnace contained a mild steel retort, 21" diameter and 48" tall. The system was assembled, evacuated, filled and purged with nitrogen gas. It was heated to an internal temperature of 969° C. at which time hydrided ferroniobium from the batch described above and contained in a sealed hopper was auger-fed into the hot vessel while the nitrogen flow through the vessel was maintained. The feeding proceeded with 300 lb being added at a rate of about 100 lb/hr for 3½ hours. During this time, a thermocouple immersed in the accumulating bed in the retort rose from 1015° C. to 1225° C. Throughout, a positive pressure of from 770 to 850 mm Hg pressure was maintained, using a flow of 15–40 cubic feet per hour of nitrogen gas. Hydrogen gas was vented from the reactor, along with unconsumed nitrogen. The temperature inside the reactor continued to rise due to nitridation and reached 1338° C. before slowly falling off to 1200° C., the set controller temperature of the furnace. At about 19 hours after the maximum temperature had been reached, the furnace power was shut off and the furnace cooled at the furnace rate under a continued nitrogen purge. In the latter stages of nitridation, prior to furnace shutoff, a simple test of nitrogen uptake was employed as an index of progress. The system was isolated and the time noted for its internal pressure to decrease by 30 mm, for example from 820 mm to 790 mm Hg. At 4½ hours after the maximum internal temperature, this time interval was 25 seconds and, at shutoff time, it had lengthened to 160 seconds. The cooled charge weight 325.6 lb. The reaction mass was substantially porous and could readily be reduced to fist-sized chunks.

Leach Run PPL1

125 gallons of 11.6N HCl was added to water (125 gallons) at 47° C. in a 275 gallon fiber glass leach tank. Steam was sparged into the tank until the temperature of the solution was raised to 55° C. Hydrofluoric acid (48%, 50 lb) was added to the tank. Then, the less than 20 mesh nitrided ferroniobium from PP1 (220 lb) was gradually added over a period of about one hour, during which time the liquid temperature rose to 64° C. Stirring and air sparging were continued for 4 hours thereafter, during which time the temperature fell to 56° C. The slurring was filtered by vacuum filtration, washed with 22 gallons of 1N HCl, then twice with 20 gallon portions of water. The damp solids recovered from the filter funnel weight 173 lbs and had a moisture content of 19%.

Oxidation to $Nb_2O_5$

The product of PP1 and another run, PP2, of the same scale was converted to oxide in a single campaign in an indirect fired rotary kiln. Satisfactory conditions were found to be a feed rate of 5–10 lb/hr, 925° C., a rotation rate of 2–8 rpm and a residence time of about 30 minutes. Excessive feed rates were followed by emergence of a grey product signifying partial oxidation. Such material was recycled and emerged with the proper yellow-white color. The overall blend of PP1 and PP2 had the following analysis: Fe, 5500 ppm, Si, 690 ppm; P, 69 ppm. The overall oxide yield was 503.4 lbs.

Aluminothermic Conversion to Niobium Metal

The above oxide was made part of a 1000 lb thermite shot. The reaction was observed to proceed smoothly and relative pure niobium metal was recovered.

Optionally, the dried product or the wet filtered product may be charged directly into a kiln. When the kiln is fired in an atmosphere containing oxygen to a temperature of from about 300° C. to about 1300° C., the oxidation can be completed in a relatively short period of time depending on the size of the charge. Preferably, the temperature should be in the range of from about 300° C. to 1000° C. In addition to the foregoing, it was observed that relatively low temperature oxidation conditions inhibits the formation of stable mixed oxides of iron, i.e., $FeNbO_4$; and niobium $NbPO_5$ which are more difficult to leach away from the niobium oxide. If it is desired to obtain a higher purity in the oxidation product by the use of additional leaching steps, it may be advantageous to employ such lower temperature oxidation conditions.

The foregoing oxidation product is suitable for the uses made normally of niobium oxide. High purity niobium oxide which is suitable for the preparation of vacuum grade ferroniobium can be obtained with further leaching. For example, after leaching with 2N HCl, as described, and kiln firing at 400° C., the cooled product can be leached with a solution of one percent ammonium bifluoride in 6N HCl. This leached product is compared in Table 1 with the typical results of the standard leach before firing.

TABLE 1

|  | Standard Leach 2 N HCl | Additional Fluoride-containing Leach after Firing |
|---|---|---|
| Fe % by wt. | 1.0 | 0.08 |
| Si % by wt. | 0.45 | 0.0135 |
| P ppm | 280 | 160 |

The lower levels of Si and P reported in the foregoing table enables the niobium oxide product to be employed for use in the subsequent preparation of vacuum grade ferroniobium by aluminothermic reduction, as well as use as an intermediate for the preparation of other compounds of niobium and for the preparation of niobium metal itself. It is, therefore, preferred in the subsequent leaching step after firing, described herein, that the aqueous leach include the addition of some fluoride ion producing compound since it has been found that this best achieves the result of removing the unwanted silicon and phosphorus values.

The variables within which the unexpected and advantageous results of the present invention can be obtained can be adjusted as described hereinafter.

During either acid leach described, hydrochloric acid is the preferred acid, although hydrofluoric acid and sulfuric acid could be used effectively for different results, if desired. For the HCl leach, the concentration of the acid should be in the range of from about 1N to about 12N. About 2N HCl is preferred. A fluoride source could include hydrofluoric acid or alkali metal fluorides.

The temperature maintained during either leach should be between 25° C. to about 100° C., preferably about 50° C. The time period for the leach solution to be in contact with the nitrided product can be from about 2 hours to about 12 hours, preferably about 4 hours. It is also preferred that stirring or other agitation be performed during contact with the leach solution.

The conditions useful during the calcining, oxidation step should include a length of time suitable for substantially complete oxidation at a temperature of from about 300° C. to 1300° C., preferably between about 300° C. to about 1000° C.

The atmosphere of the kiln can be any suitable oxygen-containing gas, including air.

While the foregoing description of the invention has exemplified the preparation of niobium oxide ($Nb_2O_5$) from a ferroniobium alloy, the general teachings contained herein with variations in temperatures, times, reactants and leach compositions suitable for the materials employed, can be utilized for the preparation of tantalum oxide ($Ta_2O_5$) from ferrotantalum, vanadium oxide ($V_2O_3$; $V_2O_4$; $V_2O_5$) from ferrovanadium, silicon oxide ($SiO_2$) from ferrosilicon and other oxides from ferroalloys where the alloying element is selected from Groups IV, V and VI, as well as the corresponding nickel alloys.

The scope of this invention is defined by the following claims interpreted in view of the pertinent prior art.

We claim:

1. A process for the preparation of metal oxides wherein the metal for forming said oxide is contained in an alloy selected from the group consisting of ferro alloy and nickel alloys comprising the steps of:
    a) providing a ferrometal or nickel metal alloy for use in the process,
    b) contacting the ferrometal or nickel metal alloy with a hydrogen-containing gas,
    c) reacting the alloy provided with the hydrogen initially at ambient temperature and at about 3 psig to about 15 psig of hydrogen gas, to form a hydride product,
    d) subdividing the hydrided product into particle sizes suitable for reaction with a nitrogen-containing gas,
    e) nitriding the hydride product by contacting the subdivided hydride product with a nitrogen-containing gas at a temperature above about 500° C., for a sufficient period of time to substantially completely react the nitrogen-containing gas with the hydride product to form nitrides of the alloy constituents,
    f) subsequent to nitride formation in the nitriding reaction, contacting the nitrides produced with an aqueous acid leach solution for a sufficient period of time to dissolve the metal nitride formed during the nitriding in the leach solution, and
    g) separating the acid soluble nitrides in the leach solution from the acid insoluble nitrides, and
    h) reacting the acid soluble nitrides with oxygen at a sufficiently elevated temperature and for a sufficient period of time to form the metal oxide of the acid insoluble metal nitride.

2. The process of claim 1, wherein the metal of the metal oxide is selected from the group consisting of niobium, tantalum, vanadium and silicon.

3. The process of claim 1, wherein the metal of the alloy is selected from the group consisting of niobium, tantalum, vanadium and silicon.

4. The process of claim 1, wherein the ferrometal alloy is ferro or ferrotantalum.

5. The process of claim 4, wherein the ferroniobium alloy contains from between about 60% by weight to about 80% by weight niobium.

6. The process of claim 4, wherein the hydride product of ferroniobium and hydrogen contains from between about 200 pp and 3000 ppm hydrogen.

7. The process of claim 6, wherein the hydride product contains about 1200 ppm hydrogen.

8. The process of claim 4, wherein the nitriding reaction is initiated at a temperature of from about 500° C. to about 800° C.

9. The process of claim 8, wherein the nitriding reaction temperature is elevated to from about 1100° C. to about 1400° C. during the reaction of nitrogen-containing gas with the hydride product.

10. The process of claim 4, wherein the nitrided product of the hydrided ferroniobium is contacted with dilute hydrochloric acid at a temperature of from about 40° C. to about 60° C.

11. The process of claim 10, wherein the acid insoluble nitride is separated from the leach solution, then said insoluble nitride is subjected to kiln firing at about 400° C. in air to form a fired product and the solid product is then subjected to leaching with a fluoride ion-containing acid solution to recover oxide product which contains less phosphorus and silicon than the fired product.

12. The process of claim 8, wherein the reaction of the acid insoluble nitrided product is conducted in air at a temperature of from about 300° C. to about 1300° C.

13. The process of claim 12, wherein the temperature is from about 300° C. to about 1000° C.

* * * * *

UNITED STATES PATENT AND TRADEMARK OFFICE
CERTIFICATE OF CORRECTION

PATENT NO. : 5,211,921

DATED : May 18, 1993

INVENTOR(S) : Sommers, et al.

It is certified that error appears in the above-identified patent and that said Letters Patent is hereby corrected as shown below:

IN THE ABSTRACT

Line 11, change "soluble" to --insoluble--.

Column 8,

Line 13, change "soluble" to --insoluble--.

Signed and Sealed this

Twelfth Day of April, 1994

Attest:

BRUCE LEHMAN

*Commissioner of Patents and Trademarks*

*Attesting Officer*